United States Patent
Koide

(10) Patent No.: US 7,199,908 B1
(45) Date of Patent: Apr. 3, 2007

(54) IMAGE-SENSING METHOD AND APPARATUS, CONTROL METHOD AND APPARATUS THEREFOR, AND STORAGE MEDIUM

(75) Inventor: Yuji Koide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/542,551

(22) Filed: Apr. 3, 2000

(30) Foreign Application Priority Data

Apr. 28, 1999 (JP) ............................................ 11-122980

(51) Int. Cl.
*H04N 1/40* (2006.01)

(52) U.S. Cl. ...................... 358/471; 358/505; 358/405; 358/437; 348/207.1; 348/207.11; 348/207.99; 348/552

(58) Field of Classification Search ................. 358/471, 358/1.15, 505, 401, 443, 448, 474, 405, 437; 348/207.1, 207.11, 552, 14.08, 14.02, 207.99
See application file for complete search history.

(56) References Cited

U.S. PATENT DOCUMENTS 860,978 A * 7/1907 Fukasaka ....................... 57/28

| 4,949,283 | A | * | 8/1990 | Yamauchi et al. | ......... 358/1.14 |
| 5,815,201 | A | | 9/1998 | Hashimoto et al. | ......... 348/232 |
| 5,963,255 | A | * | 10/1999 | Anderson et al. | ........... 348/372 |
| 6,094,689 | A | * | 7/2000 | Embry et al. | ................... 710/5 |
| 6,288,743 | B1 | * | 9/2001 | Lathrop | ................... 348/231.9 |
| RE37,635 | E | * | 4/2002 | Clark et al. | ............ 235/462.15 |
| 6,378,033 | B1 | * | 4/2002 | Nishikawa | ................... 711/103 |

FOREIGN PATENT DOCUMENTS

| EP | 0 848548 A | 6/1998 |
| EP | 0 860 978 A | 8/1998 |
| EP | 0860978 A2 * | 8/1998 |
| EP | 0 887 991 A | 12/1998 |

* cited by examiner

*Primary Examiner*—Douglas Q. Tran
*Assistant Examiner*—Negussie Worku
(74) *Attorney, Agent, or Firm*—Morgan & Finnegan LLP

(57) ABSTRACT

An image sensing apparatus comprises an image sensing unit adapted to sense an object; a signal processing unit adapted to convert an image signal outputted from the image sensing unit into digital image; a communication unit adapted to transmit a resume signal to a computer connected to the image sensing apparatus; and a switch for indicating the image sensing apparatus to transmit the resume signal to the computer. Before the resume signal is transmitted to the computer, the image sensing apparatus determines whether the computer is in a suspended state or not. If it is determined that the computer is in the suspended state, the image sensing apparatus transmits the resume signal tothe computer to release the suspended state.

18 Claims, 4 Drawing Sheets

IMAGE-SENSING METHOD AND APPARATUS, CONTROL METHOD AND APPARATUS THEREFOR, AND STORAGE MEDIUM

FIELD OF THE INVENTION

The present invention relates to an image sensing apparatus, that can be connected to an information processing apparatus via a data transmission/reception unit based on the USB (Universal Serial Bus) specification, and that has a function to release a suspended status of the information processing apparatus by transmitting a resume signal, a control method for the apparatus, and a storage medium.

BACKGROUND OF THE INVENTION

In an image sensing apparatus such as a digital camera, an image signal obtained by an image sensing device such as a CCD is converted into a digital image signal by an A/D converter and a signal processing unit. Then compression using the JPEG (Joint Photographic Expert Group) method or the like is performed on the digital image signal by a compression unit. The compressed data is stored as an image file into a recording unit such as a memory card.

In some cases, the image sensing apparatus is connected to a computer via a transmission/reception unit such as a USB unit, and the image file stored in the memory card is transmitted from the image sensing apparatus to the computer. However, when the computer enters a suspended status as a low electric consumption mode, the data transmission/reception unit of the computer is not operative, therefore the image file cannot be transmitted from the image sensing apparatus to the computer. Once the computer has entered the suspended status, to transmit the image file again from the image sensing apparatus to the computer, it is conventionally necessary to bring the transmission/reception unit such as a USB unit into operative status to release the suspended status, by e.g. depressing a particular switch of the computer.

However, in the above-described image sensing apparatus, to restore the computer from the suspended status as a low electric consumption mode and bring the transmission/reception unit such as a USB unit into the operative status, a user, who is even operating the image sensing apparatus, must move the hands off the apparatus and operate the computer. This is troublesome, and further, the user might miss a shutter chance while he/she operates the computer.

SUMMARY OF THE INVENTION

Accordingly, the present invention has been made in consideration of the above problem, and has its object to provide an image sensing apparatus which improves operability in transmission of image data to a computer or the like, a control method for the apparatus, and a storage medium.

To solve the above-described problem and attain the object, an image sensing apparatus according to the present invention has the following construction.

That is, provided is an image sensing apparatus comprising: image sensing unit adapted to sense an object; a signal processing unit adapted to convert an image signal outputted from the image sensing unit into digital image; a communication unit adapted to transmit a resume signal to a computer connected to the image sensing apparatus; and a switch for indicating the image sensing apparatus to transmit the resume signal to the computer, wherein before the resume signal is transmitted to the computer, the image sensing apparatus determines whether the computer is in a suspended state or not, and if it is determined that the computer is in the suspended state, the image sensing apparatus transmits the resume signal to the computer to release the suspended state.

Further, an image sensing apparatus control method according to the present invention has the following construction.

That is, provided is a method used in an image sensing apparatus including (a) an image sensing unit adapted to sense an object; (b) a signal processing unit adapted to convert an image signal outputted from the image sensing unit into digital image; (c) a communication unit adapted to transmit a resume signal to a computer connected to the image sensing apparatus; and (d) a switch for indicationg the image sensing apparatus to transmit the resume signal to the computer, the method comprising the step of: before the resume signal is transmitted to the computer, determining whether the computer is in a suspended state or not; and if it is determined that the computer is in the suspended state, transmitting the resume signal to the computer to release the suspended state.

Further, a storage medium according to the present invention has the following construction.

That is, a computer-reabable storage medium storing a program for providing a method used in an image sensing apparatus, the image sensing apparatus includes (a) an image sensing unit adapted to sense an object; (b) a signal processing unit adapted to convert an image signal outputted from the image sensing unit into digital image; (c) a communication unit adapted to transmit a resume signal for release to a computer connected to the image sensing apparatus, and (d) a switch for indicating the image sensing apparatus to transmit the resume signal to the computer, the method comprising the steps of: before the resume signal is transmitted to the computerm, determining whether the computer is in a suspended state or not; and if it is determined that the computer is in the suspended state, transmitting the resume signal to the computer to release the suspended state.

Further, an image-sensing method according to the present invention has the following construction.

That is, provided is an image-sensing method in an image sensing apparatus comprising: image sensing means for image-sensing an object and outputting an image signal; signal processing means for converting the image signal outputted from the image sensing means into digital image data; transmission/reception means for transmitting/receiving data with an information processing apparatus connected via a cable or wireless communication; and signal generation means for generating a trigger signal to perform image-sensing related operation, the method comprising a step of, if the image sensing apparatus and the information processing apparatus are connected to each other and the information processing apparatus is in a suspended status, transmitting a resume signal from the image sensing apparatus via the transmission/reception means to the information processing apparatus, in accordance with the trigger signal.

Further, a control apparatus according to the present invention has the following construction.

That is, provided is a control apparatus for controlling an image sensing apparatus comprising: image sensing means for image-sensing an object and outputting an image signal; signal processing means for converting the image signal outputted from the image sensing means into digital image data; transmission/reception means for transmitting/receiving data with an information processing apparatus connected via a cable or wireless communication; and signal generation means for generating a trigger signal to perform image-sensing related operation, wherein if the image sensing apparatus and the information processing apparatus are connected to each other and the information processing apparatus is in a suspended status, the control apparatus controls the image sensing apparatus to transmit a resume signal via the transmission/reception means to the information processing apparatus, in accordance with the trigger signal.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.
(First Embodiment)

Figure 1:
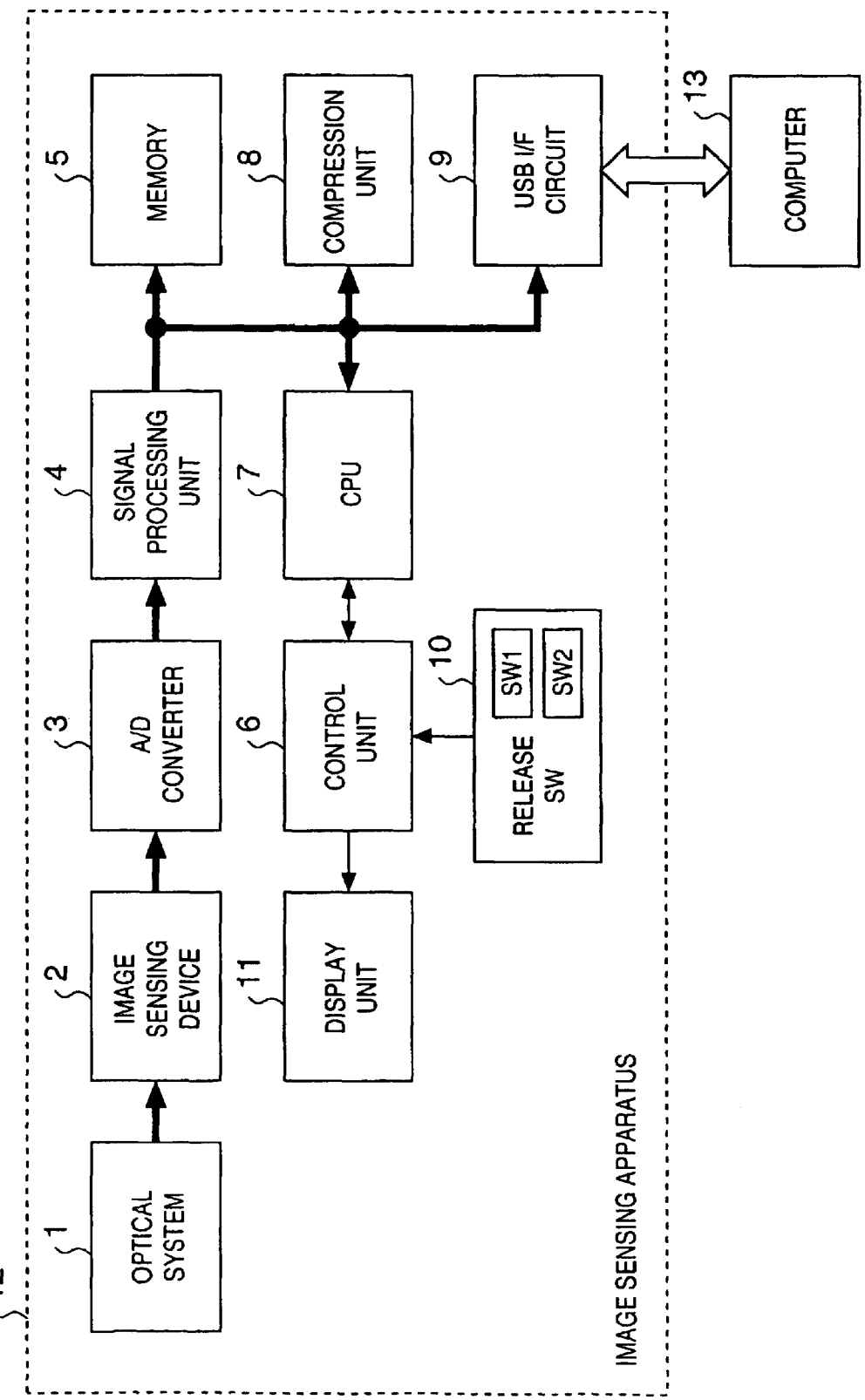
FIG. 1 is a block diagram showing a schematic construction of an image sensing apparatus according to a first embodiment of the present invention.

FIG. 1 is a block diagram showing the construction of the image sensing apparatus according to a first embodiment of the present invention.

As shown in FIG. 1, an image sensing apparatus 12 of the present embodiment photoelectric-converts an object image formed via an optical system 1 into an electric signal by an image sensing device 2 such as a CCD, and further converts the signal into a digital image signal by an A/D converter 3 and a signal processing unit 4. The digital image signal is inputted into a memory 5. The digital image signal inputted in the memory 5 is subjected to compression processing using the JPEG method or the like by a compression unit 8, and is stored as a file into the memory 5. The image sensing apparatus 12 of the present embodiment has a control unit 6 and a CPU 7 to control the above-described respective units, a release switch 10 connected to the control unit 6, and a display unit 11. Further, the image sensing apparatus 12 of the present embodiment has a USB I/F circuit 9.

Note that the optical system 1, comprising a lens, an aperture, an optical filter, a shutter and the like, forms an object image on the image sensing device.

Further, the image sensing device 2 is a CCD or the like which converts the object image formed by the optical system 1 into an electric signal.

The A/D converter 3 converts continuous electric signals outputted from the image sensing device 2 into digital signals.

The signal processing unit 4 generates a digital image signal by performing signal processing on the digitized signal.

The memory 5 is used for temporarily storing the digital image signal outputted from the signal processing unit 4 or storing a file-format digital image signal. The memory 5 comprises an internal memory or an external memory card such as a compact flash memory.

Further, the control unit 6 and the CPU 7 control the overall image sensing apparatus 12.

The compression unit 8 performs compression processing by the JPEG method or the like on the digital image signal outputted from the signal processing unit 4 and temporarily stored in the memory 5.

The USB I/F circuit 9 transmits/receives a digital image signal, transmits/receives control commands, and performs transmission/reception to notify statuses of the computer and the image sensing apparatus, with the computer 13 by a data transmission/reception method based on the USB specification.

According to the USB specification, when the computer enters the suspended status as a low electric consumption mode, any data cannot be transmitted/received between the computer and a device connected to the computer via a USB transmission/reception unit. In the USB, data transmission/reception is performed upon reception of command from the computer, therefore, if the computer is in the suspended status, any data cannot be transmitted from the device side to the computer. Once the computer has entered the suspended status, to transmit/receive data again in the USB, it is necessary to operate the computer to release the suspended status or transmit a resume signal from the device side to the computer by using a remote wake-up function defined in the USB specification, to release the suspended status of the computer.

In the image sensing apparatus 12 of the present embodiment, the USB I/F circuit 9 transmits a resume signal under the control of the control unit 6 and the CPU 7.

The release switch 10, having at least two contacts, enters any one of two-stepped statuses in accordance with e.g. the amount of depression of the switch. In this embodiment, if the release switch 10 is depressed in part way, a first contact represented as SW1 is selected, and if the release switch 10 is fully depressed, a second contact represented as SW2 is selected. When the first contact is selected, image-sensing preparation operation such as AF or AE is performed, while when the second contact is selected, image-sensing operation, and digital image-data formation and recording are performed.

Further, in the image sensing apparatus 12 of the present embodiment, as described later, when the first contact of the release switch 10 is selected, the USB I/F circuit 9 transmits a resume signal.

The display unit 11 displays various statuses of the image sensing apparatus under the control of the control unit 6 and the CPU 7, or sequentially displays stored image files in accordance with the user's instruction. The display unit 11 comprises an LCD, a TFT liquid-crystal display or the like.

Next, the operation of the image sensing apparatus having the above construction will be described in a case where the image sensing apparatus, connected with the computer via the USB transmission/reception unit, sequentially forms digital images, stores the images into the memory, and at the same time, transfers the image files in the memory to the computer.

Figure 2:
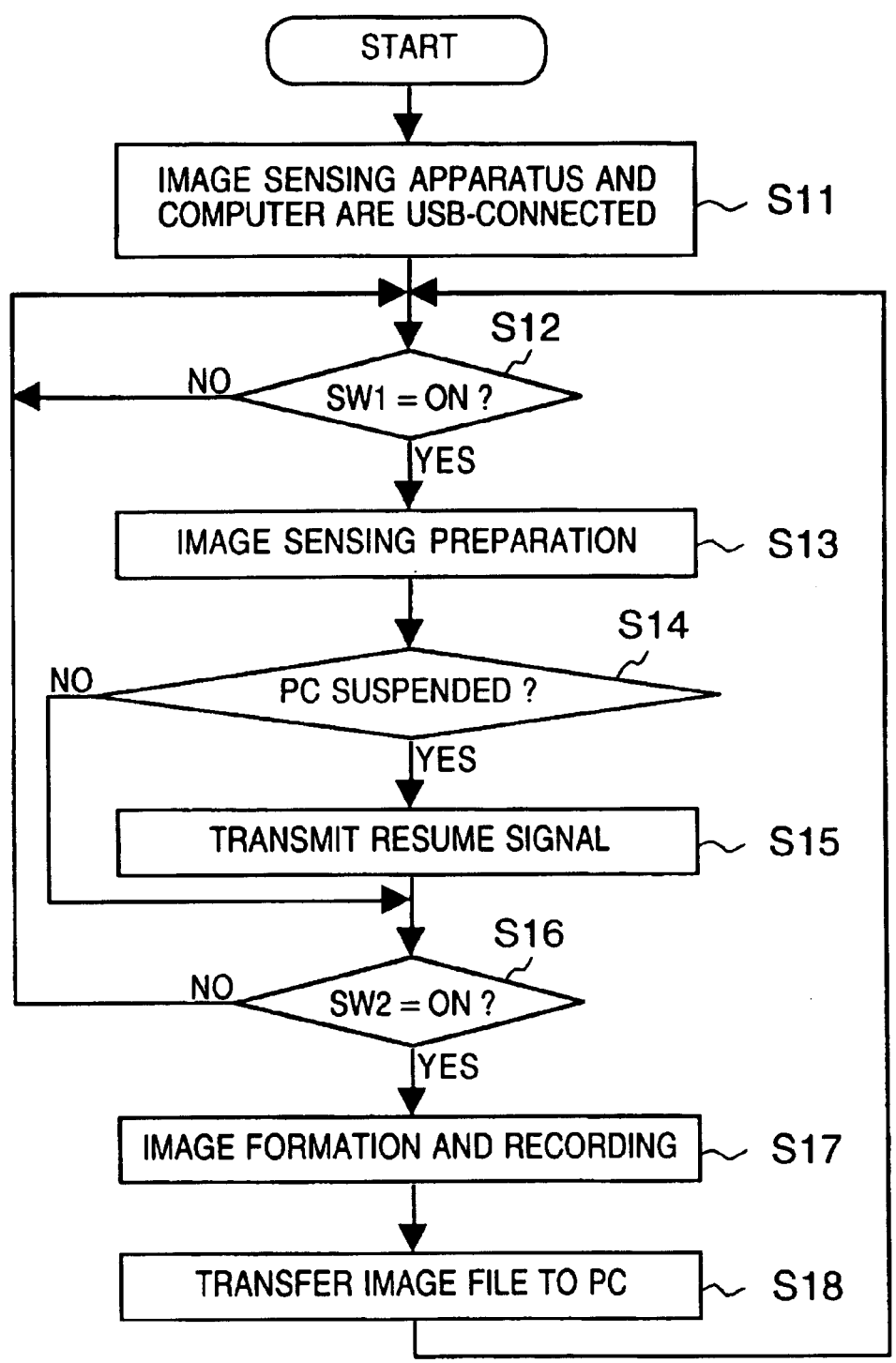
FIG. 2 is a flowchart showing image sensing operation and image file transmission to a computer by the image sensing apparatus according to the first embodiment.

FIG. 2 is a flowchart showing the operation according to the present embodiment.

First, the image sensing apparatus and the computer are connected via the USB I/F circuit 9 (S11). Next, when the user depresses the switch 10 to select the SW1 (S12), the image sensing apparatus performs an image-sensing preparation operation (S13). Next, in preparation for image file transfer to the computer after image sensing, it is examined whether or not the computer is in the suspended status (S14). If the computer is in the suspended status, a resume signal is transmitted via the USB I/F circuit 9 (S15). If the computer is not in the suspended status, the step of transmitting the resume signal is skipped. Next, it is examined whether or not the contact SW2 has been selected by the user (S16). The checking as to whether or not the contact SW2 has been selected is performed for a predetermined period. If the SW2 has not been depressed after the predetermined period, there is a possibility that the user has stopped image sensing operation. The process returns to step S12 to check whether or not the contact SW1 has been selected. If it is determined at step S16 that the contact SW2 has been selected, image sensing for formation of one digital image is performed, and the image is stored in the memory (S17). Finally, the digital image stored in the memory is transmitted to the computer by using the USB I/F circuit 9 (S18). Thus, the sequence by the image sensing apparatus to form one digital image, store the image into the memory, and transfer the image stored in the memory to the computer, is completed.

Then, the user's instruction for image-sensing preparation is waited again at step S12.

That is, in the image sensing apparatus of the present embodiment, when an obtained image is transmitted to the computer at the same time of image sensing by the image sensing apparatus, if the user has depressed the switch to select the contact SW1, the image sensing apparatus automatically transmits the resume signal to the computer if the computer is in the suspended status. Accordingly, it is unnecessary for the user to operate the computer to release the suspended status. This user's labor can be removed, and the user can avoid missing a shutter chance.

(Second Embodiment)

In the first embodiment, the image sensing apparatus transmits the resume signal to the computer, triggered by the user's depression of the switch to select the contact SW1.

However, the user does not always depresses the switch to select the contact SW2 to perform image sensing after the depression of the switch to select the contact SW1. In cases other than image sensing, the suspended status of the computer is released even though image file is not transferred to the computer.

In a second embodiment, the image sensing apparatus transmits a resume signal to the computer, triggered by the user's depression of the switch to select the contact SW2.

The construction of the image sensing apparatus of the second embodiment is the same as that in FIG. 1.

Figure 3:
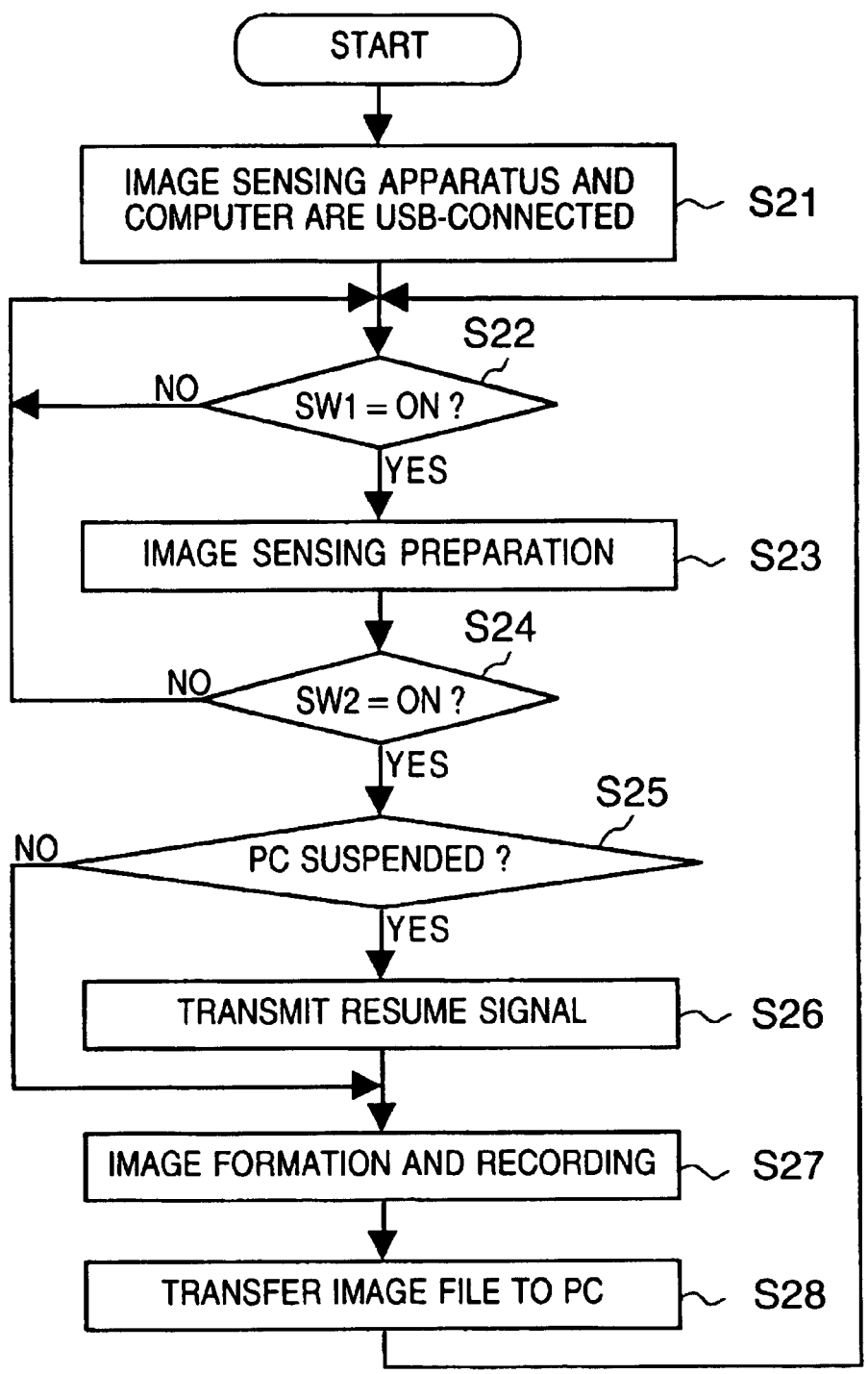
FIG. 3 is a flowchart showing the image sensing operation and the image file transmission to the computer by the image sensing apparatus according to a second embodiment.

FIG. 3 is a flowchart showing the operation of the present embodiment.

First, the image sensing apparatus and the computer are connected by the USB I/F circuit 9 (S21).

Next, when the user depresses the switch to select the contact SW1 (S22), the image sensing apparatus performs image-sensing preparation operation (S23). Next, it is examined whether or not the user has depressed the switch to select the contact SW2 (S24). The checking as to whether or not the contact SW2 has been selected is performed for a predetermined period. If the contact SW2 has not been selected after the predetermined period, there is a possibility that the user has stopped image sensing operation. The process returns to step S22, to check whether or not the contact SW1 has been selected. If it is determined at step S24 that the contact SW2 has been selected, in preparation for image file transfer to the computer after image sensing, it is examined whether or not the computer is in the suspended status (step S25). If the computer is in the suspended status, a resume signal is transmitted via the USB I/F circuit (step S26). If the computer is not in the suspended status, the step of transmitting the resume signal is skipped. Then image sensing has performed to form one digital image, the image is stored into the memory (S27). Finally, the digital image stored in the memory is transmitted to the computer by using the USB I/F circuit 9 (S28). Thus, the sequence by the image sensing apparatus to form one digital image, store the image into the memory, and at the same time, transfer the image file stored in the memory to the computer is completed.

Then, the user's instruction for image sensing preparation is waited again at step S22.

That is, in the image sensing apparatus of the present embodiment, when an obtained image is transmitted to the computer at the same time of image sensing by the image sensing apparatus, if the user has depressed the switch to select the contact SW2, the image sensing apparatus automatically transmits the resume signal to the computer if the computer is in the suspended status. Accordingly, as in the case of the first embodiment, it is unnecessary for the user to operate the computer to release the suspended status.

This user's labor can be removed, and the user can avoid missing a shutter chance.

(Third Embodiment)

In a third embodiment, the image sensing apparatus transmits a resume signal to the computer when the user has depressed the switch to select the contact SW2 then formed and stored digital image data.

The construction of the image sensing apparatus according to the third embodiment is the same as that in FIG. 1.

Figure 4:
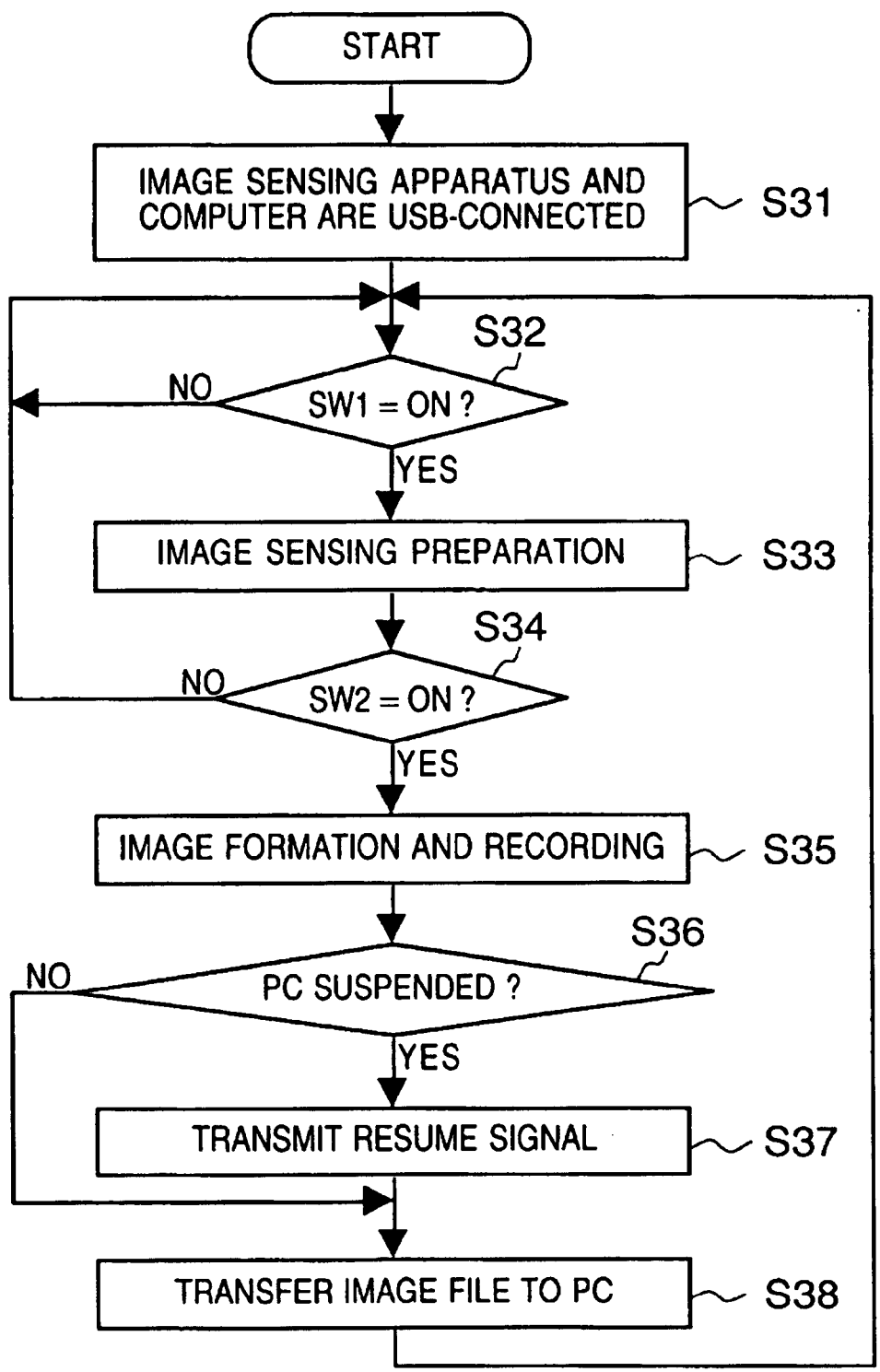
FIG. 4 is a flowchart showing the image sensing operation and the image file transmission to the computer by the image sensing apparatus according to a third embodiment.

FIG. 4 is a flowchart showing the operation according to the third embodiment.

First, the image sensing apparatus and the computer are connected by the USB I/F circuit (S31). Next, if the user has depressed the switch to select the contact SW1 (S32), the image sensing apparatus performs image-sensing preparation operation (S33). Next, it is examined whether or not the user has depressed the switch to select the contact SW2 (S34). The checking as to whether or not the contact SW2 has been selected is performed for a predetermined period. If the contact SW2 has not been selected after the predetermined period, there is a possibility that the user has stopped image sensing operation. The process returns to step S32, to check whether or not the contact SW1 has been selected. If it is determined at step S34 that the contact SW2 has been selected, image sensing is performed to form one digital image, and store the image into the memory (S35). Next, in preparation for image file transfer to the computer, it is examined whether or not the computer is in the suspended status (S36). If the computer is in the suspended status, the resume signal is transmitted via the USB I/F circuit (S37). If the computer is not in the suspended status, the step of transmitting the resume signal is skipped. Finally, the digital image stored in the memory is transmitted to the computer by using the USB I/F circuit 9 (S38). Thus the sequence by the image sensing apparatus to form one digital image, store the image into the memory, and at the same time, to transfer the image file stored in the memory to the computer is completed.

Then, the user's instruction for image sensing preparation is waited again at step S32.

That is, in the image sensing apparatus of the present embodiment, when an obtained image is transmitted to the computer at the same time of image sensing by the image sensing apparatus, if the user has depressed the switch to select the contact SW2 and performed image sensing to form and store digital image data, the image sensing apparatus automatically transmits the resume signal to the computer if the computer is in the suspended status. Accordingly, as in the case of the first and second embodiments, it is unnecessary for the user to operate the computer to release the suspended status. This user's labor can be removed, and the user can avoid missing a shutter chance.

Note that in addition to the above-described three embodiments, if it is arranged such that the image sensing apparatus automatically transmits a resume signal to the computer if it is in the suspend status when the user depresses an arbitrary switch of the image sensing apparatus, as in the case of the above embodiments, it is unnecessary for the user to operate the computer to release the suspended status. This user's labor can be removed, and the user can avoid missing a shutter chance.

Further, in any of the above embodiments, as information as to whether or not the USB-connected computer is in the suspended status is displayed on the display unit 11 in FIG. 1, the user obtains information on the suspended status of the computer while operating the image sensing apparatus.

Further, in the above embodiments, the resume signal is transmitted in accordance with manipulation on the shutter button by the user, however, the present invention is not limited to this arrangement. For example, in a case where automatic image sensing is performed intermittently at predetermined intervals, it may be arranged such that the resume signal is automatically transmitted upon each image sensing without the user's manual switch operation.

Further, the image sensing apparatus according to the present invention is not limited to a camera but may be any device to pick up an image and transmits an image signal.

Further, in the present invention, the image-sensing unit and the control device may be provided in one casing or may be provided in separate casings and connected with each other via a cable or wireless communication.

(Other Embodiment)

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium storing program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiments, and the storage medium storing the program code constitutes the invention. Furthermore, besides aforesaid functions according to the above embodiments are realized by executing the program code which is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts (FIGS. 2 to 4) described in the embodiments.

As described above, according to the present invention, it is unnecessary for the user to operate the computer to release the suspended status. This user's labor can be removed, and the user can avoid missing a shutter chance by operating the computer.

The present invention is not limited to the above embodiments and various changes and modifications can be made within the spirit and scope of the present invention. Therefore, to appraise the public of the scope of the present invention, the following claims are made.

What is claimed is:

1. An image sensing apparatus comprising:
    an image sensing unit adapted to sense an object;
    a signal processing unit adapted to convert an image signal outputted from said image sensing unit into digital image;
    a communication unit adapted to transmit a resume signal to a computer connected to said image sensing apparatus; and connected to said image sensing apparatus; and
    a switch for indicating said image sensing apparatus to transmit said resume signal to the computer,
        wherein before said resume signal is transmitted to said computer, said image sensing apparatus determines whether said computer is in a suspended state or not, and
    if it is determined that said computer is in the suspended state, said image sensing apparatus transmits said said resume signal to said computer to release the suspended state.

2. The image sensing apparatus according to claim 1, further comprising:
    a recording unit adapted to record said digital image in an internal or external memory.

3. The image sensing apparatus according to claim 1, wherein said switch having a first contact and a second contact, and
    wherein if said first contact is turned on by said switch, said image sensing apparatus enables to transmit said resume signal to said computer to release the suspended state.

4. The image sensing apparatus according to claim 1, wherein said switch having a first contact and a second contact, and to start
    wherein if said second contact is turned on by said switch, said image sensing apparatus enables to transmit said resume signal to said computer to release the suspended state.

5. The image sensing apparatus according to claim 1, wherein said signal generation means is a particular switch provided in said sensing apparatus.

6. The image sensing apparatus according to claim 1, further comprising:

a display unit to display information indicating that said computer is in the suspended state.

7. The image sensing apparatus according to claim 1, wherein said communication unit is conformed to USB (Universal Serial Bus) specification.

8. The image sensing apparatus according to claim 1, wherein before said digital image is transmitted to said computer, said image sensing apparatus determines whether said computer is in said suspended state or not.

9. The image sensing apparatus according to claim 1, wherein said switch having a first contact and a second contact, and wherein if said second contact is turned on by said switch and a recording of said digital image is completed, said image sensing apparatus enables to transmit said resume signal to said computer to release the suspended state.

10. A method used in an image sensing apparatus including (a) an image sensing unit adapted to sense an object; (b) a signal processing unit adapted to convert an image signal outputted from said image sensing unit into digital image; (c) a communication unit adapted to transmit a resume signal to a computer connected to said image sensing apparatus; and (d) a switch for indicating said image sensing apparatus to transmit said resume signal to the computer, said method comprising the steps of:

before said resume signal is transmitted to said computer, determining whether said computer is in a suspended sate or not; and if it is determined that said computer is in the suspended state, transmitting said resume signal to said computer to release the suspended state.

11. The method according to claim 10, further comprising the step of:

recording said digital image in an internal or external memory.

12. The method according to claim 10, wherein said switch has a first contact and a second contact, and wherein the method further comprises the step of:

if said first contact is turned on by said switch, enabling to transmit said resume signal to said computer to release the suspended state.

13. The method according to claim 10, wherein said switch has a first contact and a second contact, and wherein the method further comprises the step of:

if said first contact is turned on by said switch, enabling to transmit said resume signal to said computer to release the suspended state.

14. The method according to claim 10, wherein said switch has a first contact and a second contact, and wherein the method further comprises the step of:

if said first contact is turned on by said switch and said image sensing operation and a recording of said digital image is completed, enabling to transmit said resume signal to said computer to release the suspended state.

15. The method according to claim 10, further comprising the step of:

displaying information indicating that said computer is in the suspended state.

16. The method according to claim 10, wherein said communication unit is conformed to USB (Universal Serial Bus) specification.

17. The method according to claim 10, wherein before said digital image is transmitted to said computer, said determining step determines whether said computer is in said suspended state or not.

18. A computer-readable storage medium storing a program for providing a method used in an image sensing apparatus, said image sensing apparatus includes (a) an image sensing unit adapted to sense an object; (b) a signal processing unit adapted to convert an image signal outputted from said image sensing unit into digital image; (c) a communication unit adapted to transmit a resume signal to a computer connected to said image sensing apparatus; and (d) a switch for indicating said image sensing apparatus to transmit said resume signal to the computer, said method comprising the steps of:

before said resume signal is transmitted to said computer, determining whether said computer is in a suspended state or not; and if it is determined that said computer is in the suspended state, transmitting said resume signal to said computer to release the suspended state.

* * * * *